US009557940B2

(12) United States Patent
Shintani

(10) Patent No.: US 9,557,940 B2
(45) Date of Patent: Jan. 31, 2017

(54) IMAGE FORMING SYSTEM AND IMAGE FORMING METHOD WHICH ALLOW IMAGE FORMING APPARATUS TO PRINT DOCUMENTS EVEN WHEN BATTERY EXHAUSTION ATTACKS ON MOBILE COMMUNICATION TERMINAL

(71) Applicant: KYOCERA Document Solutions Inc., Osaka (JP)

(72) Inventor: Yoshihisa Shintani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/979,464

(22) Filed: Dec. 27, 2015

(65) Prior Publication Data

US 2016/0188264 A1 Jun. 30, 2016

(30) Foreign Application Priority Data

Dec. 24, 2014 (JP) ................................. 2014-260153

(51) Int. Cl.
*G06F 3/12* (2006.01)
*H04N 1/00* (2006.01)

(52) U.S. Cl.
CPC ........... *G06F 3/1205* (2013.01); *G06F 3/1236* (2013.01); *G06F 3/1263* (2013.01); *G06F 3/1285* (2013.01); *G06F 3/1292* (2013.01); *H04N 1/00307* (2013.01); *H04N 1/00899* (2013.01); *H04N 2201/0094* (2013.01)

(58) Field of Classification Search
CPC .... G06F 3/1205; G06F 3/1236; G06F 3/1263; G06F 3/1285; G06F 3/1292; H04N 1/00899; H04N 1/00307; H04N 2201/0094

USPC ........................................................ 358/1.15
See application file for complete search history.

(56) References Cited

U.S. PATENT DOCUMENTS

| | | | | |
|---|---|---|---|---|
| 5,673,070 A | * | 9/1997 | Nakanishi | ................ B41J 29/60 347/19 |
| 6,580,460 B1 | * | 6/2003 | Takahashi | .......... H04N 1/00885 348/372 |
| 6,831,444 B2 | * | 12/2004 | Kobayashi | ............ H02J 7/0047 320/136 |

(Continued)

FOREIGN PATENT DOCUMENTS

JP 2002-047839 A 2/2002

*Primary Examiner* — Allen H Nguyen
(74) *Attorney, Agent, or Firm* — Hawaii Patent Services; Nathaniel K. Fedde; Kenton N. Fedde

(57) ABSTRACT

Provided is image forming system wherein an image forming apparatus (IFA) being able to print a document even when a battery exhaustion attacks on a mobile communication terminal (MCT). A battery residual electric charge detection part of the MCT is configured to detect a residual electric charge of the battery. A print operation process part of the MCT is configured to transmit, prior to transmitting print setting data, a document priority transmission signal and the document data to the IFA, in a case where, based on the detected residual electric charge of the battery and a data size of the document data, the residual electric charge of the battery is recognized insufficient. A remote control operation receiving part of the IFA is configured to, when receives the document priority transmission request, receive the document data prior to receiving an unreceived data based on another transmission request.

5 Claims, 9 Drawing Sheets

(56) References Cited

U.S. PATENT DOCUMENTS 9,350,190 B2 * 5/2016 Iwamoto ................. H02J 7/007
2014/0285845 A1 * 9/2014 Ishikawa ............ H04N 1/00204
358/1.15

* cited by examiner

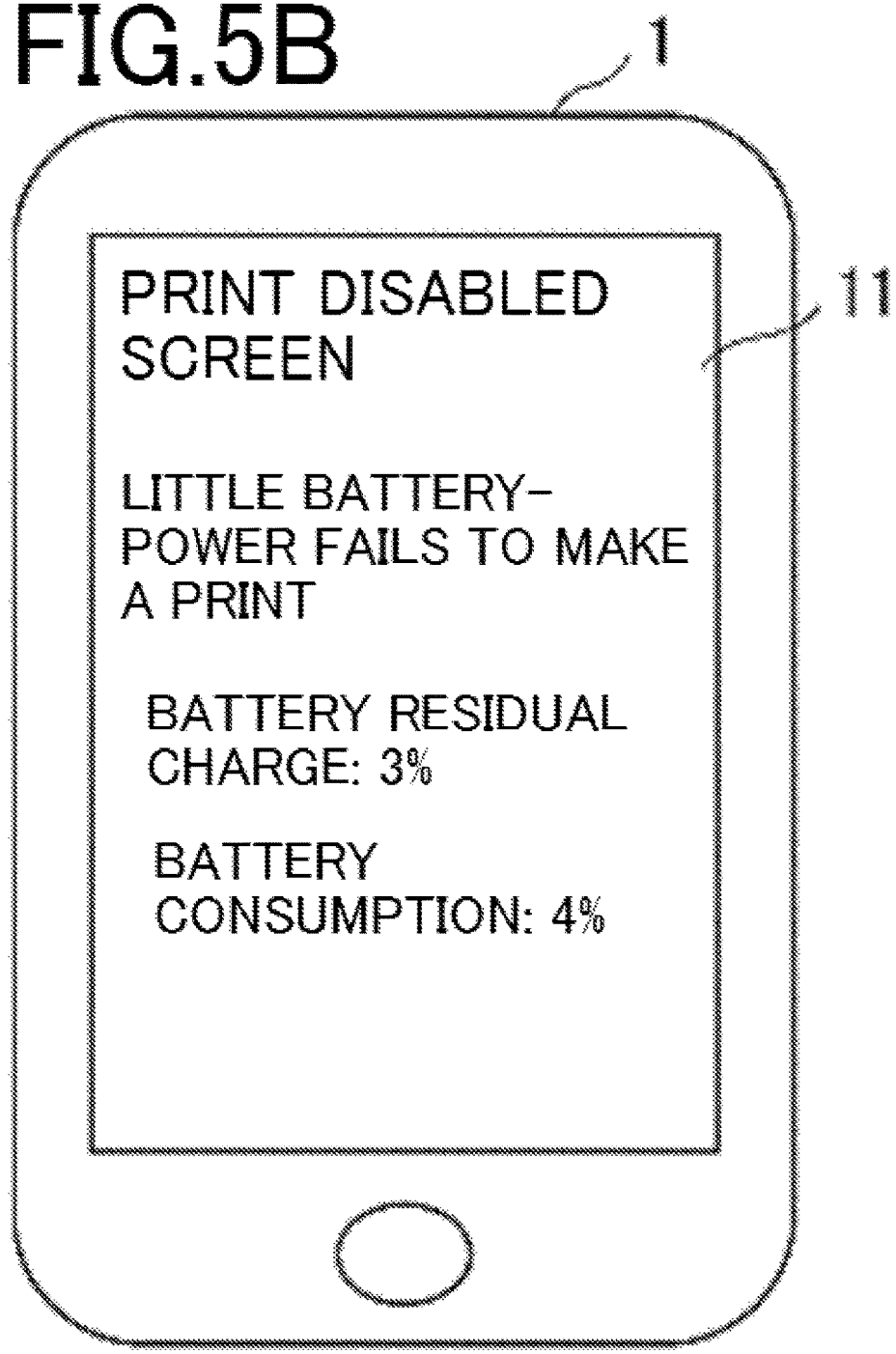

IMAGE FORMING SYSTEM AND IMAGE FORMING METHOD WHICH ALLOW IMAGE FORMING APPARATUS TO PRINT DOCUMENTS EVEN WHEN BATTERY EXHAUSTION ATTACKS ON MOBILE COMMUNICATION TERMINAL

INCORPORATION BY REFERENCE

This application is based on and claims the benefit of priority from Japanese Patent Application No. 2014-260153 filed on Dec. 24, 2014, the entire contents of which are hereby incorporated by reference.

BACKGROUND

The present disclosure relates to an image forming system that includes a mobile communication terminal and an image forming apparatus that is operable from the mobile communication terminal, and an image forming method.

Recently, a technology is known in which an image forming apparatus is operable using a terminal device, such as, for example, a smart phone or a tablet terminal. A user can transmits, from the mobile communication terminal to the image forming apparatus, a printing data set including, for example, print settings, such as image quality and image size, and a document data including, for example, text data and image data, thereby making it possible for him/her to enjoy increased convenience by causing the image forming apparatus to print a document pursuant to the print settings.

On the other hand, due to that fact that the mobile communication terminal is of a battery powered configuration, it is requested to avoid, for example, an abrupt and extreme lowering convenience caused by a battery exhaust attack on the mobile communication terminal. To avoid this, some techniques have been proposed which include, for example, switching the communication control mode between the mobile communication terminal and the main machine from a bidirectional control mode to a single directional control mode, and a notification that the battery of the mobile communication terminal is exhausted or reduced to near the operating voltage of the mobile communication terminal.

Some electronic devices having such a self-diagnosis function have functions that include, for example, an on-screen display of a service call (a request for the supervisor to recover the copy function) and an internal record keeping of the log (history) of the self-diagnosis.

However, even the known arts have drawbacks that include, for example, a battery exhaustion attack on the mobile communication terminal before the transmission of the printing data set completes may result in that a longer time is necessary for starting printing a document and/or a cumbersome operation is requested. For restarting an operation at the mobile communication terminal side, the battery has to be recharged such that the residual electric charge of the battery becomes a minimum specific amount for transmitting the printing data set, and therefore a longer time is required. In addition, executing the reoperation after coming to near the image forming apparatus requires both a reentry of the printing settings and a preparation of the document data to reload into the image forming apparatus, which necessitates cumbersome operations.

SUMMARY

The present disclosure provides an image forming system that includes a mobile communication terminal and an image forming apparatus. The mobile communication terminal, which is powered by a battery, is configured to transmit a print data set that includes a print setting data and a document data. The image forming apparatus is configured to receive the print data set from the mobile communication terminal and to print the document data based on the print setting data. The mobile communication terminal also includes a battery residual electric charge detection part and a print operation process part. The battery residual electric charge detection part is configured to detect a residual electric charge of the battery. The print operation process part is configured to transmit, prior to a transmission of the print setting data, a document priority transmission signal and the document data to the image forming apparatus, in a case where, based on the residual electric charge of the battery which is detected by the battery residual electric charge detection part and a data size of the document data, the residual electric charge of the battery is recognized to be insufficient. The image forming apparatus also includes a remote control operation receiving part. The remote control operation part is configured to, when receives the document priority transmission request, receive the document data prior to a receipt of another unreceived data.

The present disclosure also provides a method of image formation which is to be implemented by an image forming system that includes a mobile communication terminal and an image forming apparatus. In this method, the mobile communication terminal, which is configured to be powered by a battery, transmits a print data set that includes a print setting data and a document data. The image forming apparatus is configured to receive the print data set from the mobile communication terminal and to print the document data based on the print setting data. A residual electric charge of the battery is detected. The mobile communication terminal is caused to transmit, prior to a transmission of the print setting data, a document priority transmission signal and the document data to the image forming apparatus, in a case where, based on the residual electric charge of the battery which is detected by the battery residual electric charge detection part and a data size of the document data, the residual electric charge of the battery is recognized insufficient. The image forming apparatus is caused to, when the image forming apparatus receives the document priority transmission request, receive the document data prior to a receipt of another unreceived data.

BRIEF DESCRIPTION OF THE DRAWINGS

FIG. 5B shows an example of the on-screen indication of the mobile communication terminal shown in FIG. 2.

DETAILED DESCRIPTION

Figure 1:
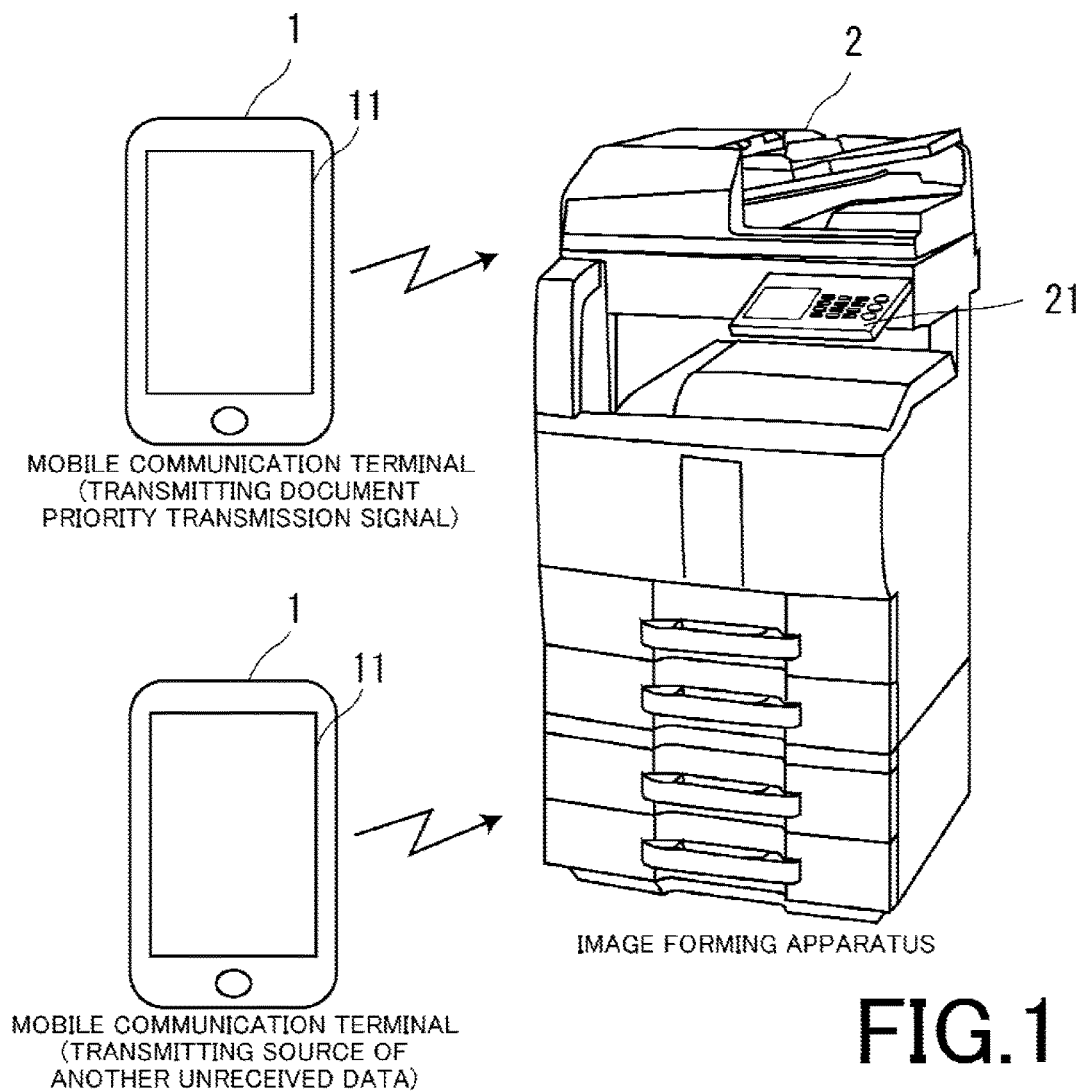
FIG. 1 is a schematic system configuration view of an image forming system according to an exemplary embodiment of the present disclosure.

Hereinbelow, an exemplary embodiment of the present disclosure will be described with reference to the attached drawings. It is to be noted in the following description of the exemplary embodiment like reference characters refer to like parts or configurations.

As illustrated in FIG. 1, an image forming system includes a mobile communication terminal 1 and an image forming apparatus 2 that is coupled to the mobile communication terminal 1 via, for example, a wireless network. The image forming apparatus 2 is an apparatus, such as a printer, copier and MFP (Multifunction Peripheral/Printer/Product), which has a printing function, and is configured to be accessible or operable from both the mobile communication terminal 1 and the operation panel 21.

Figure 2:
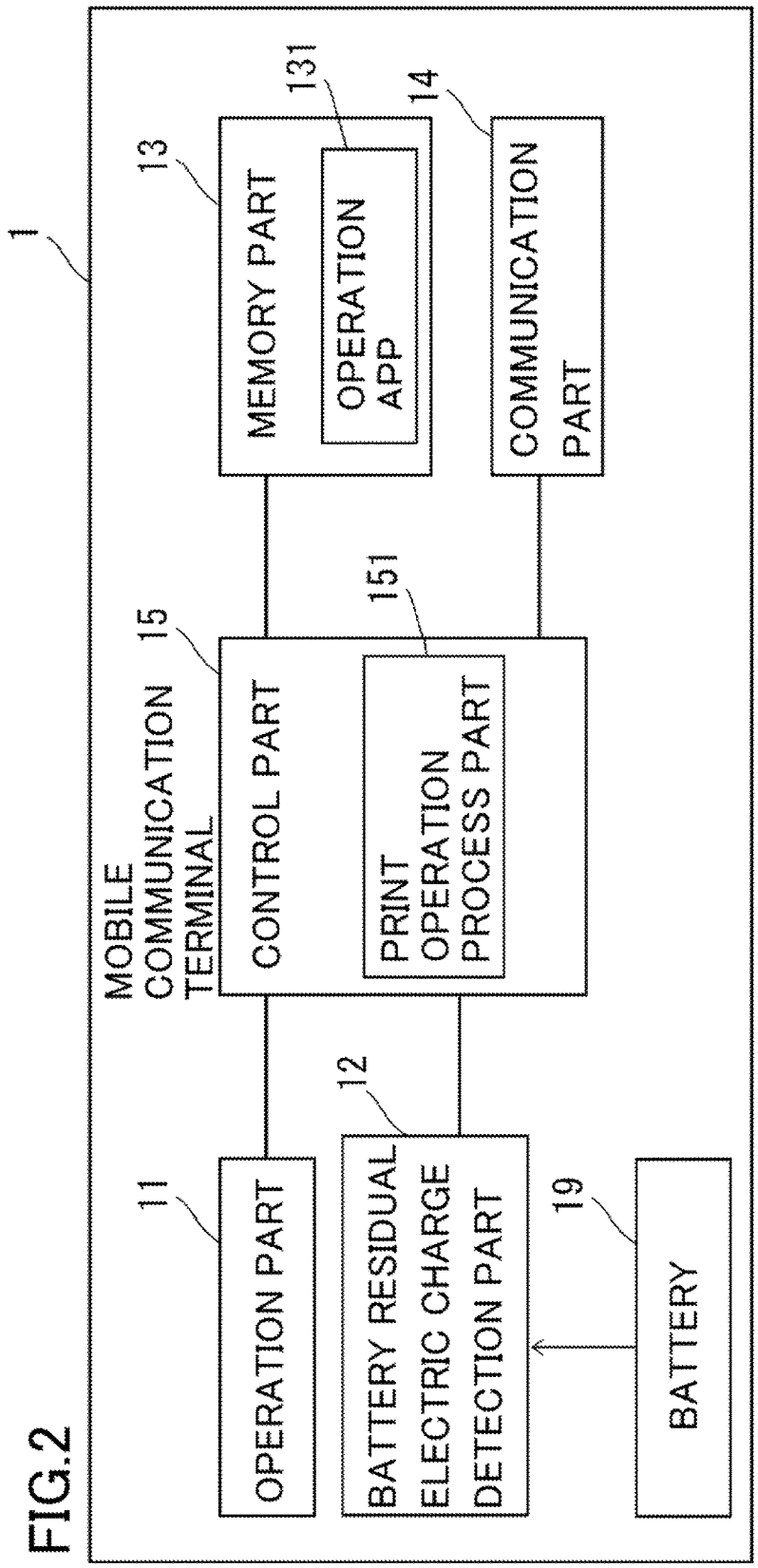
FIG. 2 is a block diagram for illustrating a configuration of a mobile communication terminal that is shown in FIG. 1.

The mobile communication terminal 1 is a portable device, such as a cellular telephone, a smart phone, a tablet terminal and a PDA (personal Digital Assistant) etc., which is powered by a battery 19. As illustrated in FIG. 2, the mobile communication terminal 1 includes an operation part 11, a battery residual electric charge detection part 12, a memory part 13, a communication part 14, and a control part 15.

The operation part 11 includes a display part that is configured to display various information and a user interface having various operation keys. The display part may be in the form of a touch panel that functions as a display means having a transparent pressure sensitive sensor provided on a surface of a display panel and an input means.

The battery residual electric charge detection part 12 is configured to detect a residual electric charge of the battery of the mobile communication terminal 1 and to notify the resulting or detected residual electric charge to the control part 15. It is to be noted that detecting a residual electric charge of the battery 19 may be achieved based on measuring a between-terminal voltage and an inner resistance of the battery or measuring incoming and outcoming currents of the battery. In addition, detecting a residual electric charge of the battery 19 may be achieved in terms of an arbitrary unit. Examples of the unit include percent when the full charged state of the battery is 100%, electric energy [Wh] and so on. In the present exemplary embodiment, the battery residual electric charge detection part 12 detects the battery residual electric charge of the battery 19 in terms of percents.

The memory part 13, such as a semiconductor memory, a HDD (Hard Disk Drive) or the like, is a memory means. The memory part 13 stores an operation APP 131 in addition to various user-inputted document data that include, for example, text data and image data. The operation APP 131, which is an application program for remotely controlling the image forming apparatus 2, is installed in the mobile communication terminal 1. A user is capable of installing the operation APP 131 in the mobile communication terminal 1 by downloading the APP 131 from, for example, the Internet via the communication part 14.

The communication 14 has a function to transmit/receive, via the wireless network, various data to the image forming apparatus 2.

The control part 15, which is coupled to the operation part 11, the battery residual electric charge detection part 12, the memory part 13 and the communication part 14, is configured to control a whole operation of the mobile communication terminal 1 in response to a specific instruction information that is inputted to the operation part 11. The control part 15 is an information processing part that is in the form of, for example, a micro-processor provided with a ROM (Read Only Memory), a RAM (Random Access Memory) and the like. The ROM stores a control program that is configured to control an operation of the mobile communication terminal 1. The control part 15 reads the control program that is stored in the ROM and loads the resulting control program on the RAM to control the whole operation of the mobile communication terminal 1 in response to the a specific instruction information that is inputted to the operation part 11.

In addition, when an operation is made, via the operation part 11, for activating the operation APP 131, the control part 15 reads the operation APP 131 that is stored in the memory part 13 and loads the resulting operation APP 131 on the RAM to activate the operation APP 131. Thus, the control part 15 has a function to act as a print operation process part 151.

The print operation process part 151 determines whether or not the residual electric charge of the battery 19 is sufficient, based on the residual electric charge of the battery 19 which is detected by the battery residual electric charge detection part 12 and a data size of the document data. If the residual electric charge of the battery 19 is recognized to be insufficient, the print operation process part 151 transmits a document priority transmission signal to the image forming apparatus 2 in advance to print setting of the document data.

Figure 3:
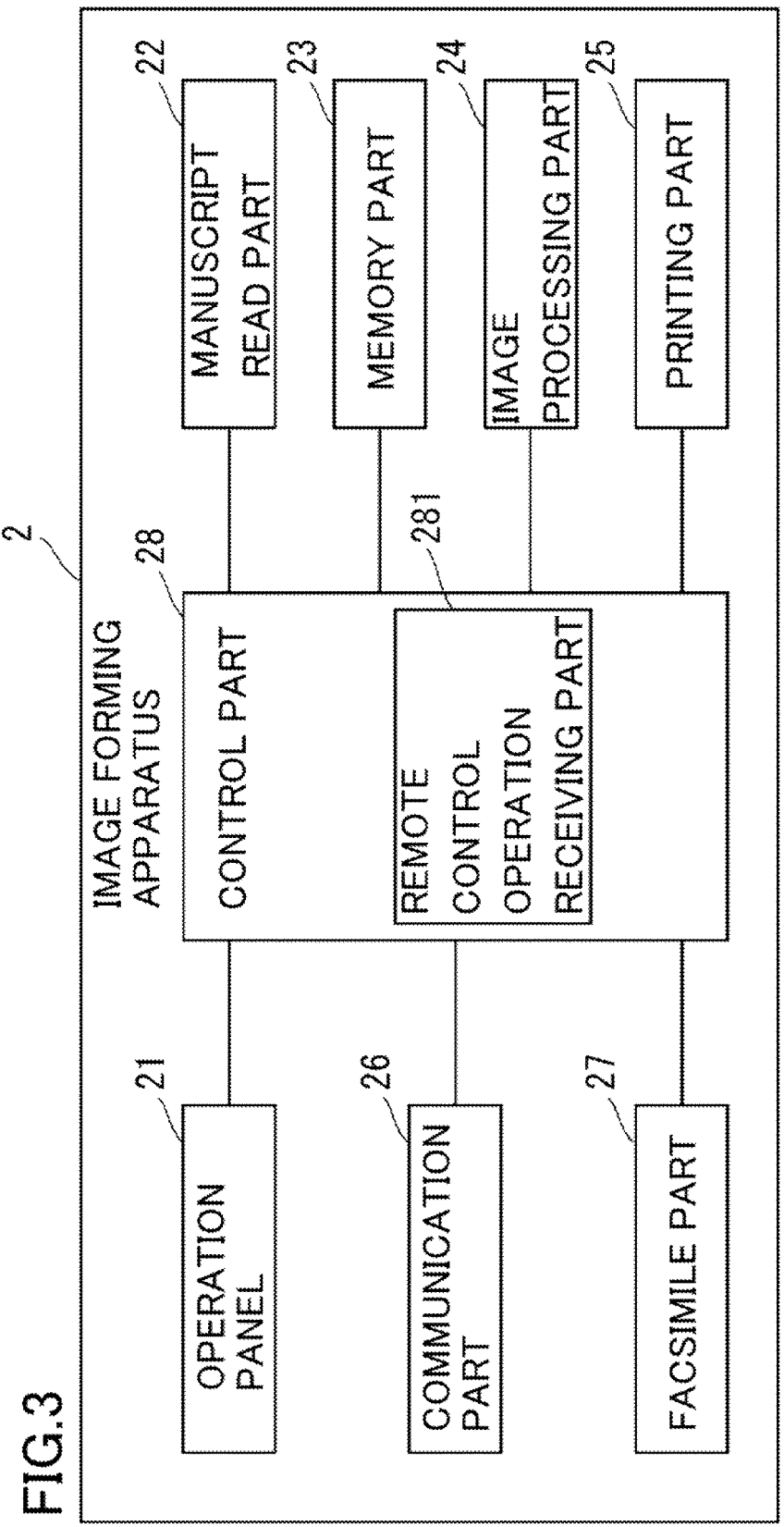
FIG. 3 is a block diagram for illustrating a configuration of an image forming apparatus that is shown in FIG. 1.

Next, with reference to FIG. 3, the image forming apparatus 2 will be described. The image forming apparatus 2, which is in the form of an MFP (Multifunction Printer), includes an operation panel 21, a manuscript reading part 22, a memory part 23, an image processing part 24, a printing part 25, a communication part 26, a facsimile part 27, and a control part 28.

The operation panel 21 includes a touch panel and operation buttons. The touch panel, which is provided with a transparent pressure sensitive sensor on a surface of a display part that is configured to indicate various operation keys and image formation appearances, acts as a display means and an input means. The touch panel is configured to receive an operation that is applied to one of the operation keys that are indicated on the display part. In addition, the operation buttons include, for example, numeric key pad for inputting numerals such as the number of sheets to be printed, a reset key for initializing setting information, a stop key for stopping a copy operation, and a start key for inputting an output indication that causes an initiation of a print operation.

The manuscript read part 22 is a scanner that emits a light beam to a manuscript that is fed from a manuscript feed device or a manuscript that is mounted by a user on a plantain glass and receives the resulting reflected light beam to read image data of the manuscript.

The memory part 23 is a memory means, such as, for example, a semiconductor memory or HDD. The memory part 23 is configured to store the image data that is read by the manuscript read part 22, and print data that is received by the communication part 26 and the facsimile part 27.

The image process part 24 is configured to cause the image data to undergo a specified image process. Examples of image improvement process that the image process part 24 provides include a zooming process, a photographic density adjustment, and a gradation adjustment.

The print part 25 is a print means that prints out the image data stored in the memory part 23. An example of image formation by the print part 25 is such that the print part 25 forms an electrostatic latent image on a surface of a photoreceptor drum based on the image data that is read out from the memory part 23 and deposits an amount of tonner on the electrostatic latent image to form a toner image. Then, the toner image thus formed is transferred onto a recording sheet and the resulting recording sheet is, after being fixed, discharged.

The communication part 24 is capable of transmitting/receiving various data, via the wireless network, to/from the mobile communication terminal 1. In addition, the communication part 26 may be capable of transmitting/receiving various data, via a LAN (Local Area Network) cable, to/from the mobile communication terminal 1.

The facsimile part 27 has a modem and creates facsimile signals from the image data that the manuscript read part 22 has read or the image data stored in the memory part 23. The facsimile part 27 has a facsimile transmission function that is capable of transmitting the resulting or created facsimile signals via a public telephone network and a facsimile receive function that is capable of receiving facsimile signals via a public telephone network.

The control part 28 is coupled to the operation panel 21, the manuscript read part 22, the memory part 23, the image process part 24, the print part 25, the communication part 26, and the facsimile part 27. The control part 28 is an information processing part that is in the form of, for example, a micro-processor provided with a ROM (Read Only Memory), a RAM (Random Access Memory) and the like. The ROM stores a control program that is configured to control an operation of the image forming apparatus 2. The control part 28 reads the control program that is stored in the ROM and loads the resulting control program on the RAM to control the whole operation of the image forming apparatus 2. In addition, the control part 28 is configured to act as a remote control operation receiving part 281 when receives the print data set, via the communication part 26, from the mobile communication terminal 1 and to cause the print part 25 to print the received print data set.

Figure 4:
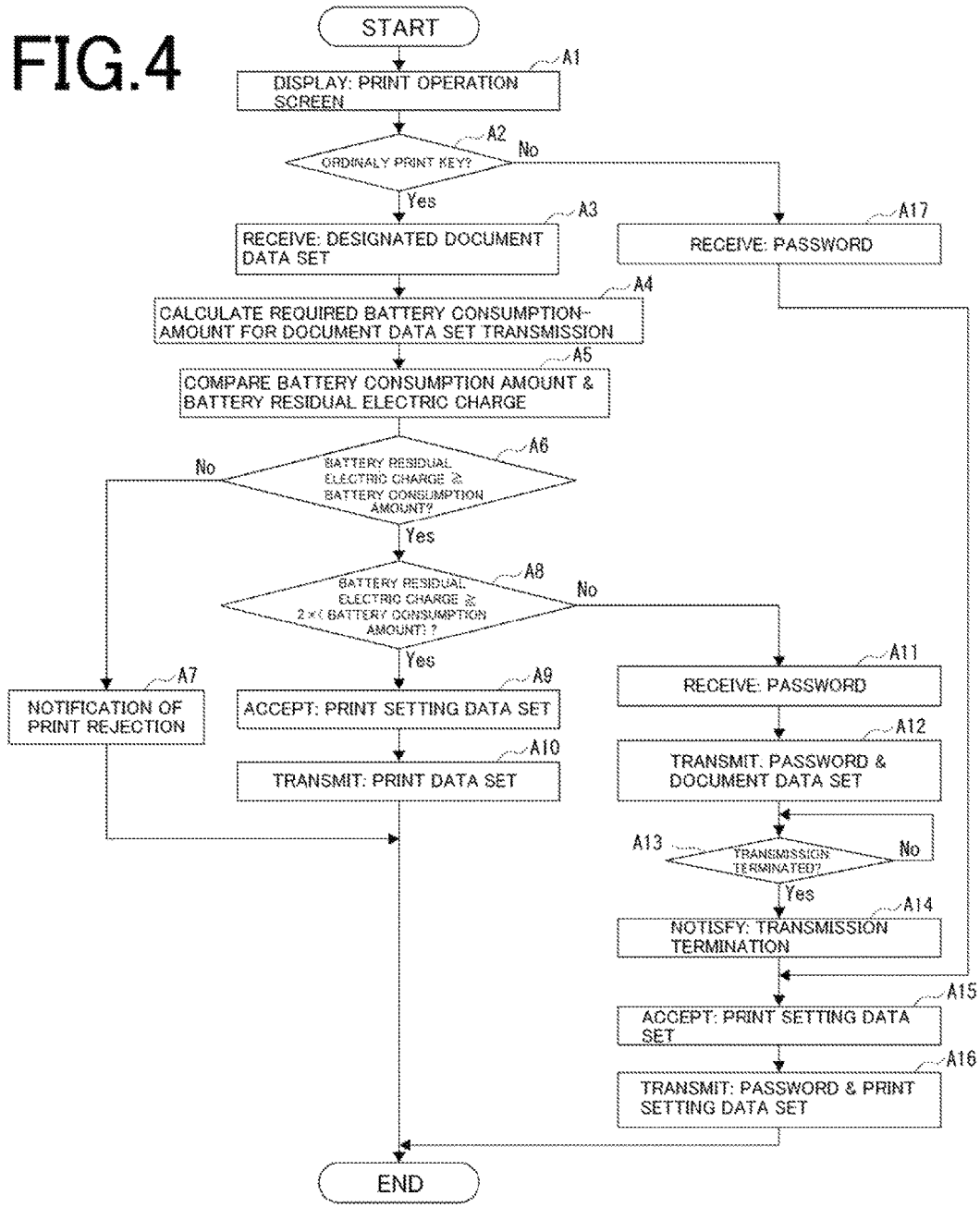
FIG. 4 is a flowchart that is illustrative of a flow of a process implemented by the mobile communication terminal shown in FIG. 2.

Next, with reference to FIGS. 4 and 5, an operation of the mobile communication terminal 1 of the present exemplary embodiment will be detailed.

Figure 5A:
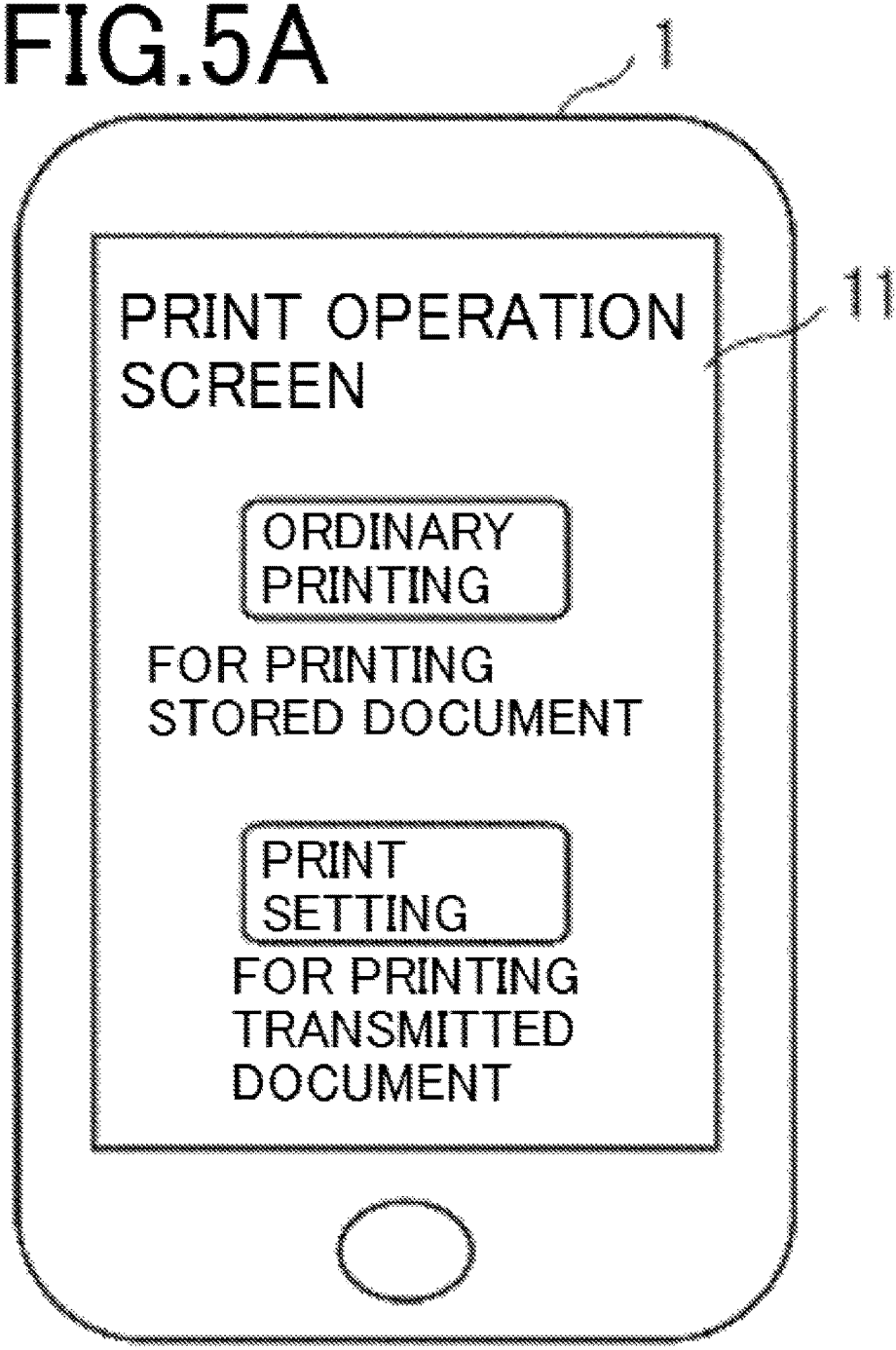
FIG. 5A shows an example of an on-screen indication of the mobile communication terminal shown in FIG. 2.

First of all, when the operation APP 131 is activated on the mobile communication terminal 1, the control part 15 begins to act as the print operation process part 151 and causes the operation part 11 to display a print operation process screen (Step A1). As illustrated in FIG. 5A, the print operation process screen provides an "ordinary print" key and a "print setting" key, the "ordinary print" key being for printing a document data stored in the memory part 13, the "print setting" key being for printing a document data that has been transmitted to the image forming apparatus 2. The user, when being in association with the print operation process screen, manipulates either one of the "ordinary print" key and the "print setting" key.

The print operation treating part 151 determines whether the "ordinary print" key is manipulated or the "print setting" key is manipulated (Step A2). In Step A2, in a case where the "ordinary print" key is manipulated, the print operation treating part 151 causes the operation part 11 to display a list of the document data stored in the memory part 13 and is ready for receipt of a designated document data to be printed (Step A3).

Next, the print operation process part 151 calculates a consumption amount of the battery 19 which is required for transmitting the designated document data (Step A4). The larger a data size of the document data, the longer a communication time, thereby increasing the consumption amount of the battery 19. The print operation process part 151 presets a unit print data size: X bytes and a consumption amount of the battery 19 per bytes: Y % data and calculates a consumption amount of the battery 19 by multiplying a data size required for color printing with (Y/X).

Next, the print operation process part 151 makes a comparison between the residual electric charge of the battery 19 which is detected by the battery residual electric charge detection part 12 and the consumption amount of the battery 19 which is calculated in Step A4 (Step A5). Then, the print operation process part 151 compares the residual electric charge is equal or greater than the consumption amount of the battery 19 (Step A6). If the result of Step A6 indicates that the residual electric charge of the battery 19 is less than the consumption amount of the battery 19, the print operation process part 151 causes the operation part 11 to display a print invalid screen that is indicative of "Print is invalid due to little residual electric charge of the battery 19". Then, the print operation process part 151 notifies the print invalid to the user (Step A7) and the control terminates the process.

If the result of Step A6 is indicates that the residual electric charge of the battery 19 is larger than or equal to the consumption amount of the battery 19, the print operation process part 151 makes a further determination whether or not the residual electric charge of the battery 19 is larger than or equal to twice the consumption amount of the battery 19 (Step A8). Then, the residual electric charge of the battery 19 is found, in Step A8, to be larger than or equal to the consumption amount of the battery 19, the print operation process part 151 allows for a receipt of a print setting from the user (Step A9). Next, the print operation process part 151 transmits a request for print data set transmission via the communication part 14 to the image forming apparatus 2 and thereafter waits for receiving a notification of transmission permission from the image forming apparatus 2. When receiving the transmission permission, the print operation process part 151 transmits both the print setting data that is received in Step A9 and the document data that is received the designation in Step A3, as a print data set, to the image forming apparatus 2 via thee communication part 14 (Step A10) and terminates the process.

In step A8, the determination whether or not the residual electric charge of the battery 19 is larger than or equal to twice the consumption amount of the battery 19 (a transmission criteria depending on the data size of the print data set) i.e., the determination whether or not the residual electric charge of the battery 19 is sufficient will assure a successful completion of the transmission of the print data set without having to be attacked by a battery exhaustion. Even though the residual electric charge of the battery 19 is larger than or equal to the consumption amount of the battery 19, a battery exhaustion may attack on the battery 19 during a transmission due to an error in the detection of the residual electric charge of the battery 19 which is performed by the residual electric charge detection part 12 and an increased communication time caused by external factors including, for example, a communication state. Thus, in Step A8, it is executed to determine whether or not the residual electric charge of the battery 19 is sufficient enough to prevent the possible battery attack. It is to be noted that the coefficient to be multiplied to the consumption amount of the battery 19 is not limited to 2 and therefore any value is available that is in excess of 1. In addition, a comparison between the residual electric charge of the battery 19 and a specified threshold value is also available for determining whether or not the residual electric charge of the battery 19 is sufficient. Though this case fails to make a precise determination based on the data size, this case does not require a calculation process for finding the consumption amount of the battery 19 and therefore makes it possible to establish a simplified determination process.

Figure 5C:
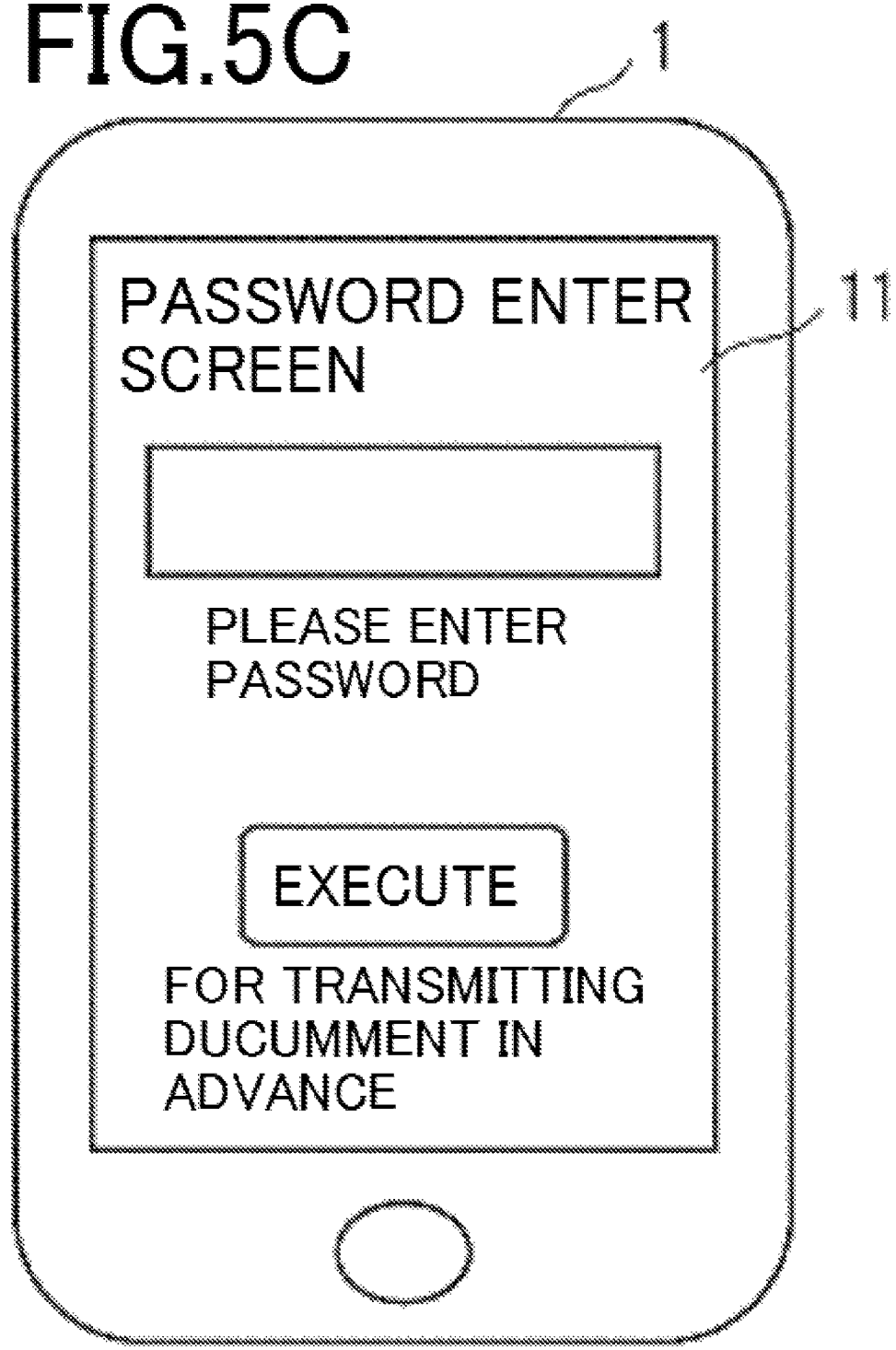
FIG. 5C shows another example of the on-screen indication of the mobile communication terminal shown in FIG. 2.

In a case where the result of Step A8 indicates that the residual electric charge of the battery 19 is less than twice the consumption amount of the battery 19, the print operation process part 151 causes the operation part 11 to display a password enter screen as shown in FIG. 5C and is ready for receipt of a password from the user (Step A11). On the password enter screen, there is provided an EXECUTION key. When the EXECUTION key is manipulated on the password enter screen, the print operation process part 151 transmits a request for document priority transmission, via the communication part 14, to the image forming apparatus 2 and thereafter waits for receiving a notification of transmission permission from the image forming apparatus 2. When the print operation process part 151 receives the notification of transmission permission from the image forming apparatus 2, the print operation process part 151 transmits both the password received in Step A11 and the document data designated in Step A3 via the communication part 14, to the image forming apparatus 2 (Step A12). Thus, in light of a possible battery exhaust attack on the battery 19 during transmission if the residual electric charge of the battery 19 is less than twice the consumption amount of the battery 19, transmitting the document data comes to have a priority. The password that is entered in Step A11 is a document identification information to identify a document data to be transmitted. The password may be previously entered and a user comprehensive alphanumeric string is available instead of the password, the user comprehensive alphanumeric string being, for example, a phone number or a mail address. This eliminates a necessity of entering the document identification information, which makes it possible to transmit the document data without requesting for the user's operation (permission).

Figure 5D:
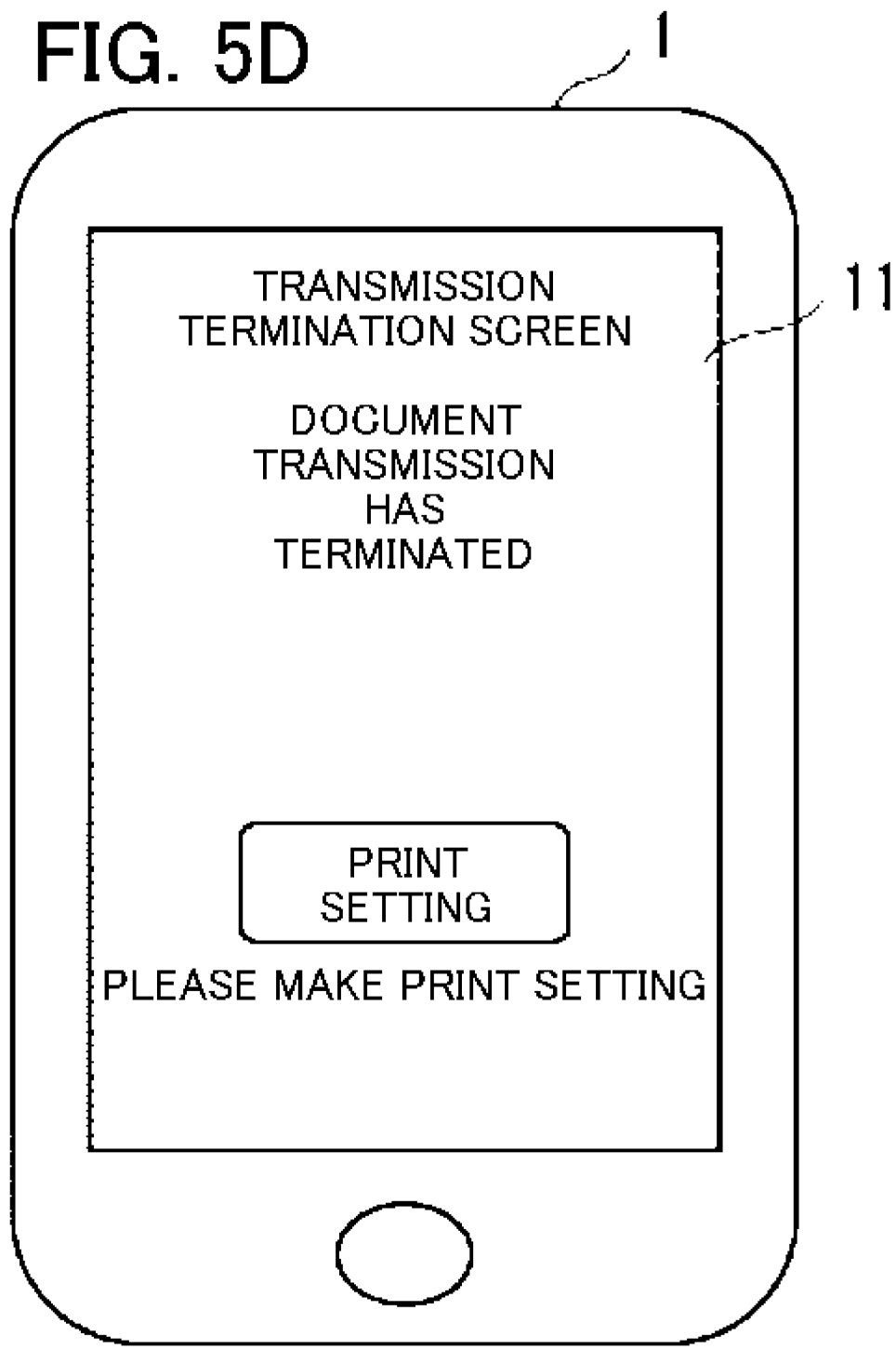
FIG. 5D shows another example of the on-screen indication of the mobile communication terminal shown in FIG. 2.

The print operation process part 151 waits for a completion of the transmission of both the password and the document data (Step A13). The print operation process part 151, when the transmission completes, causes the operation part 11 to display, as shown in FIG. 5D, a transmission completion screen that is indicative of transmission completion to notify the transmission completion to the user (Step A14). On the transmission completion screen, there is provided a "PRINT SETTING" key. When the "PRINT SETTING" key is manipulated on the transmission completion screen, the print operation process part 151 causes the operation part 11 to display a print setting screen for receiving a print setting from the user (Step A15). Next, the print operation process part 151 transmits a request for print setting, via the communication part 14, to the image forming apparatus 2 and thereafter waits for receiving a notification of transmission permission from the image forming apparatus 2. When the print operation process part 151 receives the notification of transmission permission from the image forming apparatus 2, the print operation process part 151 transmits both the password received in Step A11 and the print setting received in Step A15 to the image forming apparatus 2 (Step A16) and terminates the routine.

Due to the completion of transmission of the document data, the receipt of the print setting in Step A15 and the transmission of both the password and the print setting are not required to be performed in a sequential manner. For example, the mobile communication terminal 1 that has been charged and another mobile communication terminal 1 are available for performing such transmissions. In this case, the user manipulates the "PRINT SETTING" key on the print operation process screen. In a case where the manipulated key is not the "ORDINALY PRINT KEY" but the "PRINT SETTING" key, the print operation process part 151 causes the operation part 11 to display the print setting screen as shown in FIG. 5C to receive the password from the user (Step A17). Then, in Step A16, the print operation process part 151 transmits the password received in Step A17 and the document print setting received in Step A15, via the communication part 14, to the image forming apparatus 2 and terminates the procedure. It is to be noted that the completion of the transmission of the document data to the image forming apparatus 2 allows for inputting the print setting and the password from the operation panel 21 of the image forming apparatus 2 to print the document data.

Figure 6:
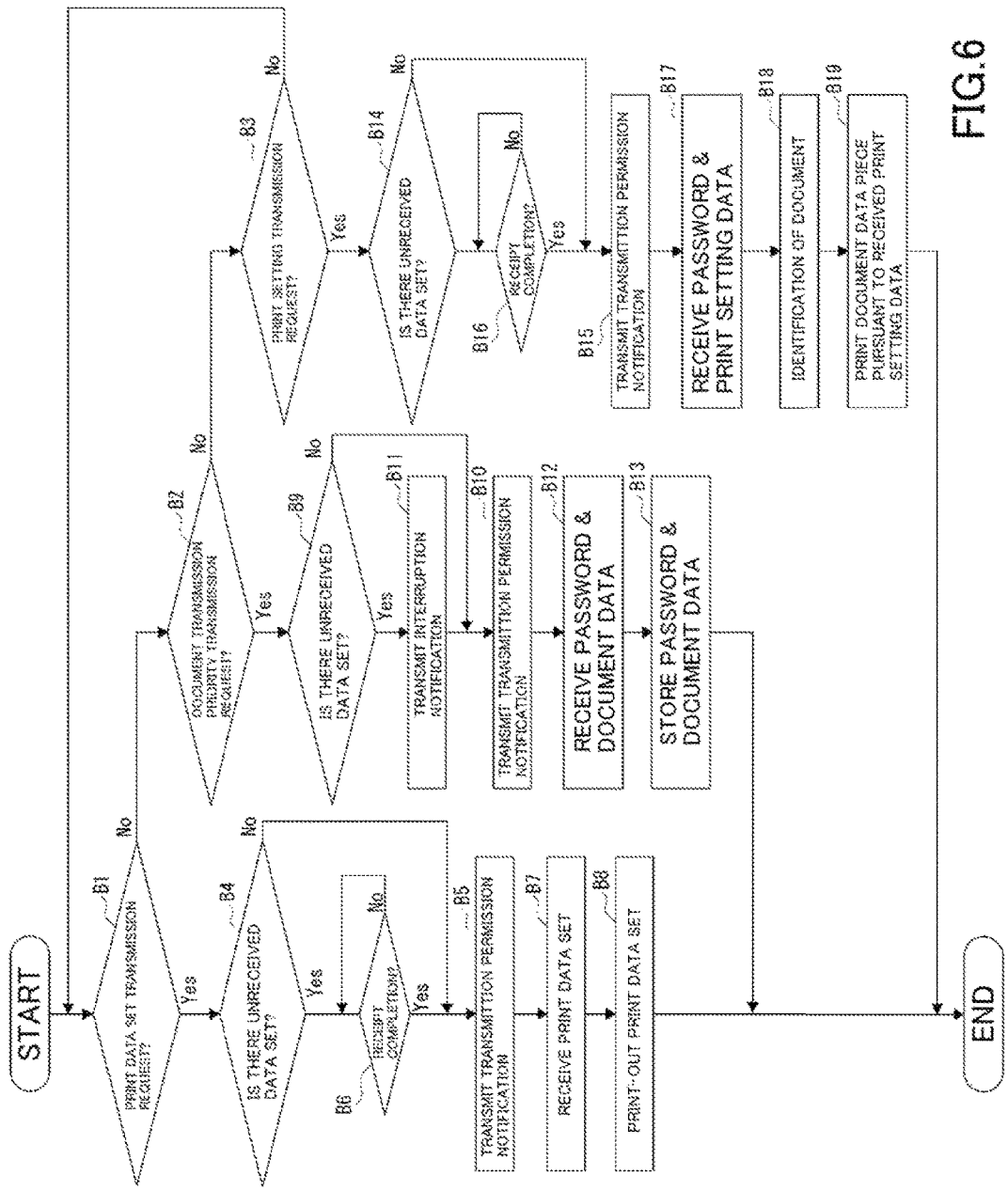
FIG. 6 is a flowchart that is illustrative of a flow of a process implemented by the image forming apparatus shown in FIG. 3.

Next, with reference to FIG. 6, an operation of the image forming apparatus 2 of the present exemplary embodiment will be detailed. At a side of the image forming apparatus 2, the remote control operation receiving part 281 waits for receiving the print data set (Step B1), receiving the document priority transmission (Step B2), and receiving the print setting transmission (Step B3).

The remote control operation receiving part 281, when receives the request for transmission of print data set in Step B1, determines whether or not there is an unreceived data set based on the preceding transmission request (Step B4). If no unreceived data set is found, the remote control operation receiving part 281 transmits a transmission permission notification to the mobile communication terminal 1 that transmitted the request for transmission of print data set at issue in Step B1 (Step B5). If the result of Step B4 is indicative of an existence of the unreceived data set, the remote control operation receiving part 281 waits for completion of receiving the unreceived data set (Step B6). When the receiving of the unreceived data set completes, the remote control operation receiving part 281 transmits the transmission permission notification in Step B5. Then, the remote control operation receiving part 281 receives the print data set (Step B7), causes the print part 25 to print the resulting data set, and terminates the procedure.

The remote control operation receiving part 281, when receives the document priority transmission request in Step B2, determines whether or not there is an unreceived data set based on the preceding transmission request (Step B9). If no unreceived data set is found, the remote control operation receiving part 281 transmits a transmission permission notification to the mobile communication terminal 1 that transmitted the document priority transmission request at issue in Step B2 (Step B10). If the result of Step B9 is indicative of an existence of the unreceived data set, the remote control operation receiving part 281 transmits an interruption notification that notifies that the document priority transmission request has a priority to the mobile communication terminal 1 that is the sender of the unreceived data set (Step B11) and the notification of transmission permission in Step B10. Then, the remote control operation receiving part 281 receives the password and the document data (Step B12), stores the resulting password and document data in the memory part 23 (Step B13), and terminates the procedure. In such away, the document priority transmission request is made to have the first priority to receive the document data in a previous manner, thereby providing the least possible battery attack on the mobile communication terminal 1. It is to be noted that the transmission permission notification to be transmitted in Step B10 may be added with information regarding the mobile communication terminal 1x to which the interruption notification was transmitted in Step B11. In this case, the mobile communication terminal 1 is capable of recognizing the mobile communication terminal 1x that is brought into a print waiting condition and therefore capable of expressing deep thanks for the print waiting.

The remote control operation receiving part 281, when receives a print setting transmission request in Step B3, determines whether or not there is an unreceived data set based on the preceding transmission request (Step B14). If no unreceived data set is found, the remote control operation receiving part 281 transmits the transmission permission notification to the mobile communication terminal 1 from which the print setting transmission request transmitted in Step B3 (Step B15). If the unreceived data set is found in Step B14, the remote control operation receiving part 281 waits for completion of the receiving unreceived data set (Step B16). The remote control operation receiving part 281, when completes the receiving unreceived data set, transmits the transmission permission notification in Step B15. Then, the remote control operation receiving part 281 receives the password and the print setting data (Step B17) and identifies the document data stored in the memory part 23 based on the password that is received in Step B17 (Step B18). Next, the remote control operation receiving part 281 causes the print part 25 to print the document data identified in Step B18 pursuant to the print setting received in Step B18 (Step B19) and terminates the procedure.

As described above, the present exemplary embodiment provides an image forming system that includes a mobile communication terminal 1 that is configured to be powered by a battery 19, the mobile communication terminal being configured to transmit a print data set that includes a print setting data and a document data and an image forming apparatus 2 that is configured to receive the print data set from the mobile communication terminal 1 and to print the document data based on the print setting data, the mobile communication terminal 1 including a battery residual electric charge detection part 12 that is configured to detect a residual electric charge of the battery 19, and a print operation process part that is configured to transmit, prior to a transmission of the print setting data, a document priority transmission signal and the document data to the image forming apparatus 2, in a case where, based on the residual electric charge of the battery 19 which is detected by the battery 19 residual electric charge detection part 12 and a data size of the document data, the residual electric charge of the battery is recognized to be insufficient. In addition, the control part 15 of the mobile communication terminal 1 includes a print operation process part 151 that is configured to transmit, prior to a transmission of the print setting data, the document data to the image forming apparatus 2. On the other hand, the image forming apparatus 2 includes a remote control operation receiving part 281 that is configured to, when receives the document priority transmission request, receive the document data prior to a receipt of another unreceived data set based on another transmission request.

The preceding configuration transmits the document data, prior to the print setting data, to the image forming apparatus 2 when the residual electric charge of the battery is not sufficient, which makes it possible to print the document data from the image forming apparatus 2 only by transmitting or inputting the print setting data. Thus, even when the battery exhaustion attacks on the mobile communication terminal 1, at a side of the image forming apparatus 2, a simple operation will bring a quick printing of the document data. In a case where a transmission of the print setting data is made to the image forming apparatus 2, it is okay to charge the battery 19 of the mobile communication terminal 1 such that the residual electric charge of the battery 19 comes to a degree that is at least necessary for the mobile communication terminal 1 to transmit to the print setting data, which will shorten the time required for restarting the operation. In addition, for inputting the print setting data to the image forming apparatus 2 after the user comes thereto, the user is free from preparing the document data again, which makes it possible to print the document data in an easy way.

In addition, in the present exemplary embodiment, the remote control receiving part 281 of the image forming apparatus 1 is configured to inform, to the sender of the unreceived data set, the interruption notification that is indicative the received document priority transmission request being of a priority.

Such a configuration allows the sender of the unreceived data set to recognize another user being of a priority, thereby increasing the usability.

Further, in the present exemplary embodiment, the print operation process part 151 of the mobile communication terminal 1 is configured to transmit the document data and the password that acts as document identification information for identifying the document data. In addition, the image forming apparatus 2 includes the memory part 23 that stores both the received document data and password.

This configuration will identify the document data to be printed in an easy way when the user comes to the image forming apparatus 2 for inputting the print setting data.

Moreover, in the present exemplary embodiment, the print operation process part 151 of the mobile communication terminal 1 is configured to transmit the print setting data and the password. On the other hand, when the remote control operation receiving part 281 of the image apparatus 2 receives the print setting data and the password, the remote control operation receiving part 281 identifies the document data stored in the memory part 23 based on the resulting password and prints the identified document data pursuant to the resulting print setting data.

This configuration enables the mobile communication terminal 1 to identify the document data to be printed and therefore even using another mobile communication terminal allows for printing the document data.

The present disclosure is not limited to the aforementioned each exemplary embodiment and therefore it is obvious that each the exemplary embodiment may be modified without departing from the sprit and scope of the present disclosure. In addition, the number of the aforementioned elements, the position of each the aforementioned element, the shape of each the aforementioned element and so on are not limited to those in aforementioned each exemplary embodiment and therefore may be changed in a suitable manner as need to implement the present disclosure.

What is claimed is:

1. An image forming system comprising:
   a mobile communication terminal that is powered by a battery and transmits a print data including a print setting data and a document data; and
   an image forming apparatus that receives the print data from the mobile communication terminal and prints the document data based on the print setting data, wherein the mobile communication terminal includes
      a print operation process part that receives a designation of the document data to be printed,
      a battery residual electric charge detection part that detects a residual electric charge of the battery, and a print operation process part that
  calculates a consumption amount of the battery which is required for the print operation process part transmitting the document data designated by the received designation by,
  makes a comparison between the residual electric charge of the battery detected by the battery residual electric charge detection part and the consumption amount of the battery calculated,
  notifies the user that the print is invalid, in a case where the residual electric charge of the battery is recognized to be less than the consumption amount of the battery, and
  transmits, prior to a transmission of the print setting data, a document priority transmission signal and the document data to the image forming apparatus, in a case where, the residual electric charge of the battery is recognized to be larger than or equal to the consumption amount of the battery but to be insufficient, and the image forming apparatus includes
  a remote control operation receiving part that, when receiving the document priority transmission request determines whether or not there is unreceived data based on a preceding transmission request, and receives the document data prior to a receipt of the unreceived data based on the preceding transmission request, in a case where the unreceived data based on the preceding transmission request is determined to exist.

2. The image forming system according to claim 1, wherein
the remote control operation receiving part of the image forming apparatus transmits an interruption notification, which tells to have a priority for received document priority transmission request, to a transmission source of the unreceived data.

3. The image forming system according to claim 1, wherein
the print operation process part of the mobile communication terminal transmits the document data and a document identification information that identifies the document data, and
the image forming apparatus further includes a memory part that stores received document data and document identification information.

4. The image forming system according to claim 3, wherein
the print operation process part of the mobile communication terminal transmits the print setting data and the document identification information, and
the remote control operation receiving part of the image forming apparatus, when receiving the print setting data and the document identification information, identifies the document data stored in the memory part and prints identified document data based on the received printing data.

5. A method of image formation which is to be implemented by an image forming system that includes a mobile communication terminal that is powered by a battery and transmits a print data including a print setting data and a document data, and an image forming apparatus that receives the print data from the mobile communication terminal and prints the document data based on the print setting data, the method comprising the steps of:
receiving, by the mobile communication terminal, a designation of the document data to be printed,
detecting a residual electric charge of the battery by the mobile communication terminal;
calculating, by the mobile communication terminal, a consumption amount of the battery which is required for the mobile communication terminal transmitting the document data designated by the received designation,
making, by the mobile communication terminal, a comparison between the residual electric charge of the battery detected by the battery residual electric charge detection part and the consumption amount of the battery calculated,
notifying, by the mobile communication terminal, the user that the print is invalid, in a case where the residual electric charge of the battery is recognized to be less than the consumption amount of the battery,
transmitting, prior to a transmission of the print setting data, a document priority transmission signal and the document data to the image forming apparatus, in a case where, the residual electric charge of the battery is recognized to be larger than or equal to the consumption amount of the battery but to be insufficient, by the mobile communication terminal; and
when the image forming apparatus receives the document priority transmission request,
  determining, by the image forming apparatus, whether or not there is unreceived data based on a preceding transmission request, and
  receiving the document data prior to a receipt of the unreceived data based on the preceding transmission request in a case where the unreceived data based on the preceding transmission request is determined to exist, by the image forming apparatus.

* * * * *